United States Patent [19]

Ryan et al.

[11] Patent Number: 5,512,702
[45] Date of Patent: Apr. 30, 1996

[54] METHOD FOR IN-SITU IMMOBILIZATION OF LEAD IN CONTAMINATED SOILS, WASTES, AND SEDIMENTS USING SOLID CALCIUM PHOSPHATE MATERIALS

[75] Inventors: James A. Ryan, Cincinnati; Terry J. Logan, Columbus; Qi Y. Ma, Columbus; Samuel J. Traina, Columbus, all of Ohio

[73] Assignee: The Ohio State University Research Foundation

[21] Appl. No.: 148,725

[22] Filed: Nov. 8, 1993

[51] Int. Cl.$^6$ ................................................ B09B 3/00
[52] U.S. Cl. ................................ 588/256; 405/128
[58] Field of Search ........................... 588/249, 252, 588/256, 257; 405/128, 129, 263

[56] References Cited

U.S. PATENT DOCUMENTS

| | | | |
|---|---|---|---|
| 4,737,356 | 4/1988 | O'Hara et al. | 588/256 |
| 5,193,936 | 3/1993 | Pal et al. | 588/256 X |
| 5,284,636 | 2/1994 | Goff et al. | 588/256 X |

*Primary Examiner*—David H. Corbin

[57] ABSTRACT

Solid calcium phosphate materials are used for in-situ immobilization of lead contaminated soils, wastes, and sediments by mixing the solid calcium phosphate material with the lead contaminated material and leaving the mixture in place. The solid calcium phosphate material includes, for example, naturally occurring apatite, synthetic hydroxyapatite, dibasic calcium phosphate, or phosphate rock.

17 Claims, No Drawings

METHOD FOR IN-SITU IMMOBILIZATION OF LEAD IN CONTAMINATED SOILS, WASTES, AND SEDIMENTS USING SOLID CALCIUM PHOSPHATE MATERIALS

This invention was made with Government support under Contract No. CR-816843-01-0 awarded by the United States Environmental Protection Agency. The Government has certain rights in the invention.

FIELD OF THE INVENTION

The present invention relates to methods for in-situ immobilization of lead in materials such as soils, wastes, and sediments that are contaminated with lead. More particularly, the invention relates to a method for mixing lead-contaminated material with solid calcium phosphate materials such that the lead is rendered immobile, and the bioavailability is reduced to acceptable levels.

BACKGROUND OF THE INVENTION

Lead is a heavy metal which is toxic to mammals if it is ingested in a form in which it can be metabolized and absorbed in the body, i.e., when it is ingested in a bioavailable form. The extensive use and widespread disposal of lead in the environment has contaminated many soils and wastes, as well as water contacting those soils and wastes. Thus, it is important to develop methods for minimizing lead solubility and for minimizing the bioavailability of lead from the environment.

Currently, many technologies are employed to clean up contaminated soils and wastes including thermal, biological, and physical/chemical treatments. These techniques generally require removing the contaminated soil, treating it, and either replacing it on-site or disposing of it away from the area of contamination. Such removal technologies are costly to practice, and destructive to the sites from which wastes are removed. Furthermore, because of the bulk of wastes that must be removed, and the presence of lead in such wastes, application of removal technologies presents a disposal problem when the removed materials are disposed of away from the site of contamination. In addition, these removal technologies are often ineffective in fully removing heavy metals or reducing their bioavailability.

In order to address problems of cost, unsightliness, and waste volume associated with removal technologies, in-place or in-situ treatment technologies have also been developed. Some of these include: 1) flushing of the soil with fluids that dissolve the lead; 2) immobilization of the lead in place by sorption or ion exchange of lead onto materials introduced into the waste; 3) precipitation of the lead in an insoluble form; 4) degradation of the lead-containing materials by chemical or biological techniques, such that the lead is solubilized, followed by removal of the solubilized lead; or 5) attenuation of the lead by addition of inert materials to the lead-contaminated waste. However, these existing in-situ technologies are generally either expensive or ineffective in removing heavy metals or reducing their bioavailability. For instance, soil flushing creates a high volume of lead-containing liquid that must be treated and disposed elsewhere. Also, many of the existing immobilization and attenuation technologies require the addition of large quantities of material that lead to unsightliness at the treatment site. Furthermore, many of the existing in-situ technologies involve several complex and time consuming treatment steps. Finally, many of the existing in-situ technologies involve chemical reactions that proceed with difficulty, very slowly, or inefficiently when applied at a contaminated site.

It has been suggested that phosphate minerals have the potential to immobilize lead. Nriagu, 11 Inorg. Chem. 2499 (1972); 37 Geochim. Cosmochim. Acta 367 (1973); 37 Geochim. Cosmochim. Acta 1735 (1973); and 38 Geochim. Cosmochim. Acta 887 (1974). Nriagu theorizes that lead is immobilized by phosphate due to the low solubility of lead orthophosphates, e.g., hydroxypyromorphite $[Pb_{10}(PO_4)_6(OH)_2]$.

The use of synthetic hydroxyapatite to remove lead from an aqueous solution has been disclosed. Y. Takeuchi and H Arai, 21 *J. Chem. Eng. Jpn.* 98 (1988) summing up work from 1981 to 1988). However, Takeuchi and Arai did not report the final aqueous lead concentrations in the solutions tested, so that the effectiveness of their method for removing lead could not be evaluated. Furthermore, Takeuchi and Arai did not investigate the use of synthetic hydroxyapatite to immobilize lead in lead contaminated solid materials.

Therefore, although use of phosphate minerals for immobilizing lead has been suggested in the prior art, there has been no prior disclosure of a method for accomplishing immobilization of lead in lead-contaminated solids such as wastes and sediments using solid calcium phosphate-containing materials.

SUMMARY OF THE INVENTION

Accordingly, it is an object of the present invention to provide an improved method of immobilizing lead in situ in lead-contaminated materials. The lead-contaminated materials can be soils, sands (e.g., foundry sands or blow-down sands from sandblasting lead-based paints), sediments, solid or hazardous wastes, and sludges. It is an additional object of the invention to use readily available, inexpensive solid calcium phosphate containing materials such as synthetic hydroxyapatite, naturally occurring apatite, dibasic calcium phosphate, or phosphate rock to immobilize lead. It is a further object of the invention to accomplish lead immobilization efficiently and effectively. Finally, it is an object of this invention to accomplish lead immobilization in such a way that the solubility and bioavailability of lead in the soils, wastes or sediments (or dissolved in moisture in contact with the soils, wastes or sediments) are reduced to levels that are no longer of environmental concern.

According to the present invention, the lead in lead contaminated solid materials is immobilized in-situ by mixing the lead contaminated solid material with solid calcium phosphate material and leaving the mixture of lead contaminated solid material and solid calcium phosphate material in place. Immobilization of the lead takes place quickly—within 24–48 hours, and requires only the normal field moisture conditions of the lead contaminated solid material in order for immobilization of the lead to occur. The lead contaminated solid material can be a wide range of materials, e.g., soil, sand, sediments, solid wastes, hazardous wastes, and sludges. The solid calcium phosphate material can be a variety of materials, such as naturally occurring apatite, phosphate rock, synthetic hydroxyapatite, or dibasic calcium phosphate.

DETAILED DESCRIPTION

According to the current invention, the amount of lead in the lead-contaminated solid material to be immobilized is first determined. This is done by analyzing for total lead in the lead-contaminated solid material, using a method such as those known in the art. One such method, for example, is Method 3050, Total Lead, U.S. Environmental Protection Agency Report SW-846, Test Methods for Evaluating Solid Wastes, Physical/Chemical Methods, which is hereby incorporated by reference. Sufficient solid calcium phosphate material is then mixed or tilled into the lead-contaminated solid material. In the preferred embodiment, the amount of solid calcium phosphate material should be one to two times the stoichiometric amount of total lead in the lead contaminated solid material. The reaction occurs in place; lead immobilization is complete in 24–48 hours. Because the lead has been immobilized, the mixture can then be left in place. Under normal field conditions, no moisture needs to be added to the mixture, or added with the solid calcium phosphate material; the normal field moisture present in the lead contaminated solid material is sufficient for immobilizing the lead.

Lead contaminated solid materials that can be treated by this invention are any solid materials containing lead that needs to be immobilized. This includes, but is not necessarily limited to: soil, sand, sediments, sludges (for example, as defined in 40 CFR § 240.101(x) or 40 CFR § 257.3 as amended in 58 Fed. Reg. 9248, 9385 (Feb. 19, 1993)), solid wastes (for example, as defined in 40 CFR § 240.101(y)), or hazardous wastes (for example, as defined in 40 CFR § 261.3). Sand can include, but is not necessarily limited to naturally occurring sand that has become contaminated with lead, foundry sand, or blow-down sand from paint removal operations. These definitions from the Code of Federal Regulations are hereby incorporated by reference.

Solid calcium phosphate materials that can be used to immobilize lead according to the method of the invention include naturally occurring fluorapatite [$Ca_{10}(PO_4)_6F_2$] or hydroxyapatite [$Ca_{10}(PO_4)_6(OH)_2$], synthetic hydroxyapatite, dibasic calcium phosphate [$CaHPO_4$], or phosphate rock.

When the method of the invention is applied, solid calcium phosphate material first dissolves into the surrounding moisture yielding soluble phosphate. The soluble phosphate then combines with the lead in the lead-contaminated solid material, forming the extremely insoluble precipitate, hydroxypyromorphite. One example of the chemical reaction, using hydroxyapatite as the form of solid calcium phosphate material, can be described by the following equations:

Dissolution (log K=28.92):

$$Ca_{10}(PO_4)_6(OH)_2(c) + 14H^+ \rightarrow 10Ca^{2+} + 6H_2PO_4^- + 2H_2O$$

Precipitation (log K=8.28):

$$10Pb^{2+} + 6H_2PO_4^- + 2H_2O \rightarrow Pb_{10}(PO_4)_6(OH)_2(c) + 14H^+$$

The overall reaction, therefore (log K=20.64) is:

$$Ca_{10}(PO_4)_6(OH)_2(c) + 10Pb^{2+} \rightleftharpoons Pb_{10}(PO_4)_6(OH)_2(c) + 10Ca^{2+}$$

As can be seen by the high equilibrium constant, this dissolution and precipitation reaction will fix the lead in an immobile form. The bioavailability of such fixed lead is reduced to acceptable levels.

Several studies were carried out: 1) to elucidate the mechanism of lead immobilization by solid calcium phosphate materials, and 2) to determine the parameters of using solid calcium phosphate materials for immobilizing lead from aqueous solution, from ion-exchange resins, and from lead-contaminated soil materials. These studies are illustrated by the series of examples below; an explanation of the chemistry follows each example. The studies are described in more detail in the paper by Ma, et al., *In Situ Lead Immobilization by Apatite,* 27 Envtl Sci. Technol. 1803 (1993), which is incorporated herein by reference. The first six examples show that the chemical reaction of the invention is, first, dissolution of the solid calcium phosphate material followed by precipitation of hydroxypyromorphite. Examples 7–9 are embodiments of the invention, itself.

EXAMPLE 1

Immobilization of Aqueous Lead by Hydroxyapatite or by Aqueous Phosphate.

Aqueous lead was reacted either with hydroxyapatite or aqueous sodium phosphate ($NaH_2PO_4 \cdot H_2O$) at controlled pH's of 3, 4, 5, 6, and 7. Specifically, at each pH, 150 mL solutions of lead nitrate ($Pb(NO_3)_2$) containing 500 mg Pb/L were contacted for 1 hour either with 0.2 g of hydroxyapatite or 0.07 g of $NaH_2PO_4 \cdot H_2O$ at each of the pH's. Hydroxypyromorphite was formed at all pH's in the presence either of hydroxyapatite or aqueous sodium phosphate. When lead nitrate was reacted with hydroxyapatite, little hydroxyapatite was present at pH 3, due to its dissolution under acid conditions, but hydroxyapatite was present at other pH's. When the lead nitrate was reacted with aqueous sodium phosphate, the only mineral species present was hydroxypyromorphite. This formation of hydroxypyromorphite under all conditions shows that in the presence of lead in solution, hydroxyapatite first dissolves and that dissolution of the hydroxyapatite is followed by the precipitation of hydroxypyromorphite.

EXAMPLE 2

Immobilization of Aqueous Lead by Hydroxyapatite and Dibasic Calcium Phosphate.

Dibasic calcium phosphate ($CaHPO_4$), hydroxyapatite, or a mixture of the two were reacted with aqueous lead in the form of lead nitrate. Specifically, 0.1 mg of the solid was reacted with 200 mL of solution containing either 100 or 500 mg of Pb/L. The reaction was carried out on a reciprocating shaker for 2 hours. pH was controlled to 6 by appropriate addition of dilute sodium hydroxide. At the higher concentrations of lead, there was evidence of rapid crystallization of hydroxypyromorphite. The dibasic calcium phosphate was most effective at reducing the concentration of lead in the aqueous phase. Specifically, when the initial concentration of lead was 100 mg/L, the residual concentrations of lead ranged from 6.21 μg/L (after being in contact with a combination of hydroxyapatite and dibasic calcium phosphate) to 2.99 μg/L (after being in contact only with dibasic calcium phosphate). When the initial concentration of lead was 500 mg/L (i.e., 500,000 μg/L), the residual concentrations of lead ranged from 89,400 μg/L (after being in contact with hydroxyapatite) to 13.8 μg/L (after being in contact only with dibasic calcium phosphate). X-ray diffraction and scanning electron microscopy showed that most of the lead precipitated with phosphate to form discrete hydroxypyromorphite phases near the surface of the solid hydroxyapatite or dibasic calcium phosphate. This example also shows that lead concentrations are significantly reduced in the presence of solid calcium phosphate materials.

EXAMPLE 3

Immobilization of Aqueous Lead by
Hydroxyapatite; No Added Phosphate.

The immobilization of lead was investigated without the addition of aqueous phosphate. 0.2 g of reagent-grade hydroxyapatite was reacted with 50 mL solutions containing 50, 100, or 500 mg of Pb/L, i.e., a lead/hydroxyapatite ratio ranging from 12.5 to 125 mg/g; separate samples of each of these suspensions were shaken for periods of 0.5, 1, 2, 34, 8, and 24 hours, respectively. The final lead concentrations ranged from 0.55–19.7 µg/L. Most of the lead precipitated out of solution within 0.5 hours, and additional amounts precipitated over the next several hours, up to 8 hours. For example, for an initial concentration of lead of 500 mg/L, the residual concentration was 19.7 µg/L at 0.5 hours, and 4.46 µg/L at 8 hours. The initial amounts removed were due to precipitation of hydroxypyromorphite, although removal of lead could have been due to adsorption by either the starting material, hydroxyapatite, or the hydroxypyromorphite that was formed over the course of the study, pH's increased throughout, demonstrating dissolution of hydroxyapatite followed by precipitation of hydroxypyromorphite. Surface transmission electron microscopy and X-ray diffraction also confirmed the presence of discrete crystals of hydroxypyromorphite.

EXAMPLE 4

Immobilization of Aqueous Lead by
Hydroxyapatite; Kinetics.

The kinetics of lead immobilization were tested. Samples containing 0.2 g of hydroxyapatite were reacted with 150 mL solutions containing 500 mg of Pb/L; separate samples of these suspensions were shaken for 0.5, 1, 5, and 10 minutes, respectively. Lead removal was rapid—93% being removed within 0.5 minutes. X-ray diffraction studies confirmed that discrete crystals of hydroxypyromorphite were also formed within 0.5 minutes. The rapid kinetics and the X-ray diffraction studies show dissolution of hydroxyapatite, followed by precipitation of hydroxypyromorphite.

EXAMPLE 5

Immobilization of Aqueous Lead by
Hydroxyapatite; Behavior of Dilute Solutions.

0.2 g samples of hydroxyapatite were contacted, on a shaker, for 1 hour, either with 8 L of a 1 mg/L solution of lead or 2 L of a 5 mg/L solution of lead. Again, the lead was effectively removed, and X-ray diffraction patterns showed the formation of discrete hydroxypyromorphite crystals.

EXAMPLE 6

Immobilization of Aqueous Lead by Natural
Apatite (Fluoroapatite).

Three natural apatites from Idaho, North Carolina, and Central Florida were tested. X-ray diffraction patterns showed the apatites to be primarily fluoroapatite. In each case, 0.2 g of the apatite was shaken for 1 hour with 200 mL solutions of 0, 1 and 5 mg/L of lead, respectively. For the 1 mg/L solutions of lead, all the apatites reduced the initial lead concentration to below the drinking water standard of 15 µg/L of lead. For the 5 mg/L solutions of lead, only one of the natural apatites reduced the initial lead concentration to below the drinking water standard. This poorer performance of the natural fluoroapatites is expected, because the fluoroapatites are less soluble than hydroxyapatites. However, the poorer performance of fluoroapatite, in turn, shows that the mechanism of lead immobilization is dissolution of the apatite followed by precipitation of hydroxypyromorphite.

EXAMPLE 7

Immobilization Of Exchangeable Lead by
Hydroxyapatite.

In one embodiment of the invention, exchangeable lead was tested, using ion exchange resins as a proxy for a soil, because lead in soils and solid wastes is expected to be adsorbed as exchangeable lead rather than being dissolved in solution that is in contact with the solid material. Accordingly, 3 g samples of Dowex 50W-X8 were saturated with lead, and then reacted with 0.2 g of hydroxyapatite in 200 mL of deionized water on a shaker for 0.5, 1 and 2 hours, respectively. No hydroxypyromorphite was detected in the hydroxyapatite residue, indicating that the reaction did not occur in the bulk solution. The resin was coated with a white precipitate, which was examined by energy dispersive scanning electron microscopy, and shown to be hydroxypyromorphite. Furthermore, the concentrations of lead in the solution increased slightly over the time of the study showing that the hydroxyapatite not only immobilizes lead, but supplies cations to displace lead from the resin's exchange sites into solution.

EXAMPLE 8

Immobilization of Dissolved Lead in
Lead-Contaminated Soil Material by
Hydroxyapatite.

In another embodiment of the invention, the lead-contaminated soil from an abandoned lead battery reprocessing site was tested. The waste soil had a pH of 4.3 and a total lead concentration of 21,000 mg/kg (i.e., 2.1% by weight). 6 g samples of the soil material were reacted with 30 mL of distilled deionized water containing 0, 0.5, 1, and 2 g of hydroxyapatite, respectively. Separate samples were reacted on a shaker for 5, 24, and 48 hr, respectively. The suspensions were then centrifuged at 15,000 rpm for 20 minutes, and the filtrates were analyzed for lead. The reaction was essentially complete in 5 hours. In the control sample (no hydroxyapatite), the filtrate contained 2273 µg/L of lead. The concentration of lead was reduced to 220 µg/L for the sample in contact with 0.,5 g of hydroxyapatite, and to 36 µg/L for the sample in contact with 2 g of hydroxyapatite. The drop to acceptable levels of the concentration of lead in the soils and wastes shows the dissolution of hydroxyapatite followed by the precipitation of hydroxypyromorphite.

EXAMPLE 9

Treatment of soils and wastes in situ.

In the preferred embodiment of the invention, representative samples of the soil or waste to be treated are first analyzed to determine the total amount of lead to be immobilized. The normal field moisture conditions of the soil or waste are adequate for the lead immobilization reaction to occur. Solid phosphate containing material sufficient to provide phosphate in amounts ranging from one to two times the stoichiometric amount of total lead in the lead-contaminated solid material is mixed or tilled into the soil or waste. The treated soil or waste material is left in place. In order to estimate more precisely the amount of lead needing to be immobilized, small samples of soil or waste can be treated as in Example 8, above, for test periods of 24–48 hours each.

The preceding examples are set forth to illustrate the principles of the invention, and specific embodiments of operation of the invention. The examples are not intended to limit the scope of the method. Additional embodiments and advantages within the scope of the claimed invention will be apparent to one of ordinary skill in the art.

We claim:

1. A method for in-situ immobilization of lead contaminated solid materials comprising:
   determining the amount of lead in the lead contaminated solid material that needs to be immobilized;
   mixing the lead contaminated solid material with an amount of solid insoluble calcium phosphate material sufficient to react with the lead in the lead contaminated solid material;
   allowing a sufficient time period for a chemical reaction to take place wherein the lead in the lead contaminated solid material becomes immobilized and biologically unavailable; and
   leaving the mixture of any remaining lead contaminated solid material, any remaining solid insoluble calcium phosphate material, and the immobilized lead in place.

2. The method of claim 1 wherein the lead contaminated solid material is soil, sand, sediment, solid waste, hazardous waste, or sludge.

3. The method of claim 2 wherein the lead contaminated solid material is soil.

4. The method of claim 2 wherein the lead contaminated material is sand.

5. The method of claim 4 wherein the sand is foundry sand.

6. The method of claim 4 wherein the sand is blow-down sand from sand-blasting of lead-based paint coatings.

7. The method of claim 2 wherein the lead contaminated solid material is sediment.

8. The method of claim 2 wherein the lead contaminated solid material is solid waste.

9. The method of claim 2 wherein the lead contaminated solid material is hazardous waste.

10. The method of claim 2 wherein the lead contaminated solid material is sludge.

11. The method of claim 1 wherein the amount of available phosphate in the solid insoluble calcium phosphate material is within the range of one to two times the stoichiometric amount necessary to immobilize the lead.

12. The method of claim 1 wherein the solid insoluble calcium phosphate material is naturally occurring apatite.

13. The method of claim 1 wherein the solid insoluble calcium phosphate material is synthetic hydroxyapatite.

14. The method of claim 1 wherein the solid insoluble calcium phosphate material is dibasic calcium phosphate.

15. The method of claim 1 wherein the solid insoluble calcium phosphate material is phosphate rock.

16. The method of claim 1 wherein the time period for the reaction of the lead contaminated solid material and the solid insoluble calcium phosphate material is 24–48 hours.

17. The method of claim 1 wherein the substantial portion of reacted lead is such that available lead is reduced to below 15 µg/L.

* * * * *

UNITED STATES PATENT AND TRADEMARK OFFICE
CERTIFICATE OF CORRECTION

PATENT NO. : 5,512,702
DATED : April 30, 1996
INVENTOR(S) : James A. Ryan, et al It is certified that error appears in the above-indentified patent and that said Letters Patent is hereby corrected as shown below:

On the title page, item [75], third Inventor, "Qi Y. Ma's address should read -- Gaineville, Fl.--.

Col. 2, line 13, insert " (" before "summing up".

Col. 5, line 11, change "34" to --4 --.

Col. 5, line 22, after study, change "," to --. --.

Signed and Sealed this

Twenty-first Day of January, 1997

Attest:

BRUCE LEHMAN

Attesting Officer    Commissioner of Patents and Trademarks